(12) United States Patent
Lee et al.

(10) Patent No.: US 10,079,621 B2
(45) Date of Patent: Sep. 18, 2018

(54) ANTENNA DEVICE AND METHOD OF CONTROLLING THE SAME

(71) Applicant: Samsung Electronics Co., Ltd., Suwon-si, Gyeonggi-do (KR)

(72) Inventors: Woo-Sup Lee, Suwon-si (KR); Jung-Sik Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 301 days.

(21) Appl. No.: 14/994,693

(22) Filed: Jan. 13, 2016

(65) Prior Publication Data

US 2016/0204836 A1    Jul. 14, 2016

(30) Foreign Application Priority Data

Jan. 14, 2015 (KR) .................. 10-2015-0006795

(51) Int. Cl.
*H01Q 1/24* (2006.01)
*H04B 5/00* (2006.01)
*H01Q 7/00* (2006.01)
*H02J 50/10* (2016.01)
*H02J 7/02* (2016.01)
*H02J 50/40* (2016.01)

(52) U.S. Cl.
CPC ........... *H04B 5/0087* (2013.01); *H01Q 1/243* (2013.01); *H01Q 7/00* (2013.01); *H02J 50/10* (2016.02); *H02J 7/025* (2013.01); *H02J 50/40* (2016.02)

(58) Field of Classification Search
CPC ................. H01Q 1/243; H01Q 7/00
See application file for complete search history.

(56) References Cited

U.S. PATENT DOCUMENTS

| 3,956,751 | A | * | 5/1976 | Herman | ................ | H01Q 1/36 343/744 |
| 2009/0001930 | A1 | * | 1/2009 | Pohjonen | ............ | H01Q 1/2225 320/108 |
| 2013/0109309 | A1 | | 5/2013 | Desclos et al. | | |

FOREIGN PATENT DOCUMENTS

KR    10-2005-0066476 A    6/2005

* cited by examiner

*Primary Examiner* — Dieu H Duong
(74) *Attorney, Agent, or Firm* — Jefferson IP Law, LLP

(57) ABSTRACT

An antenna device is provided. The antenna device includes contact terminals including a first contact terminal and a second contact terminal, sub-coil antennas each including at least one loop, and a switch configured to selectively connect sub-coil antennas to the first contact terminal and the second contact terminal according to a control signal input through the first contact terminal and the second contact terminal.

14 Claims, 9 Drawing Sheets

ANTENNA DEVICE AND METHOD OF CONTROLLING THE SAME

CROSS-REFERENCE TO RELATED APPLICATION(S)

This application claims the benefit under 35 U.S.C. § 119(a) of a Korean patent application filed on Jan. 14, 2015 in the Korean Intellectual Property Office and assigned Serial number 10-2015-0006795, the entire disclosure of which is hereby incorporated by reference.

TECHNICAL FIELD

The present disclosure relates to an antenna device and a method of controlling the same.

BACKGROUND

Various functions of electronic devices, such as wireless charging and near field communication (NFC), may require separate antennas having different characteristics. For example, the frequency for a resonant wireless charging antenna may be 8 MHz, the frequency for an inductive wireless charging antenna may be 100 KHz to 200 KHz, the frequency for an NFC antenna may be 13.56 MHz, and the frequency for a magnetic secure transmission (MST) antenna may be 70 KHz.

Space is required to mount the coil antenna on the electronic device. Accordingly, there is a difficulty in mounting a coil antenna that occupies a predetermined area in the interior of the electronic device. Accordingly, in recent technologies, coil antennas are mounted on the outside of an electronic device such as a battery or a battery cover and are connected to a circuit of the electronic device via contacts.

The above information is presented as background information only to assist with an understanding of the present disclosure. No determination has been made, and no assertion is made, as to whether any of the above might be applicable as prior art with regard to the present disclosure.

SUMMARY

According to the related art, because different coil antennas are required for functions of the electronic device, mounting areas are required for an electronic device, a battery, or a battery cover on which a coil antenna is mounted.

Furthermore, according to the related art, when different coil antennas are mounted on a battery and a battery cover connected to the electronic device through contact terminals for the functions of the electronic device, separate contact terminals are necessary for the coil antennas.

FIGS. 6A and 6B are views illustrating an example of applying a coil antenna according to the related art.

Referring to FIG. 6A, the battery cover on which a near field communication (NFC) coil antenna and a wireless charging coil antenna are mounted, fourth contact terminals are necessary. In this way, the battery or the battery cover, on which a plurality of contact terminals are mounted, may cause problems, such as reducing the mounting space for a printed board assembly (PBA), an aesthetic problem, and a contact error of a contact terminal, due to the plurality of contact terminals. Furthermore, the electronic device may also undergo the above-mentioned problems, such as having a reduced mounting space for a PBA, an aesthetic problem, and a contact error of a contact terminal.

Aspects of the present disclosure are to address at least the above-mentioned problems and/or disadvantages and to provide at least the advantages described below. Accordingly, an aspect of the present disclosure is to provide an antenna device that, when different coil antennas are necessary for functions of an electronic device, can minimize the number of contact terminals for a coil antenna and can minimize a mounting space for the coil antenna, and a method of controlling the same.

In accordance with an aspect of the present disclosure, an antenna device is provided. The antenna device includes contact terminals comprising a first contact terminal and a second contact terminal, sub-coil antennas each including at least one loop, and a switch configured to selectively connect sub-coil antennas to the first contact terminal and the second contact terminal according to a control signal input through the first contact terminal and the second contact terminal.

In accordance with another aspect of the present disclosure, a method of controlling an antenna of an electronic device is provided. The method includes receiving an input for selecting any one of a plurality of modules formed in the electronic device, reconfiguring a switch to selectively connect sub-coil antennas to form an antenna loop based on the selected module, and receiving a signal from the antenna loop.

The antenna device and the method of controlling the same according to the present disclosure can provide different coil antennas for specific functions of an electronic device by minimizing the number of contact terminals for a coil antenna and minimizing a mounting space for the coil antenna. Accordingly, problems such as a reduced mounting space of a PBA occurring on a battery or a battery cover due to a plurality of contact terminals, an aesthetic problem, and a contact error of a contact terminal can be solved. Furthermore, manufacturing cost can be reduced by reducing a mounting space of a PBA and reducing the number of turns of sub-coil antennas.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
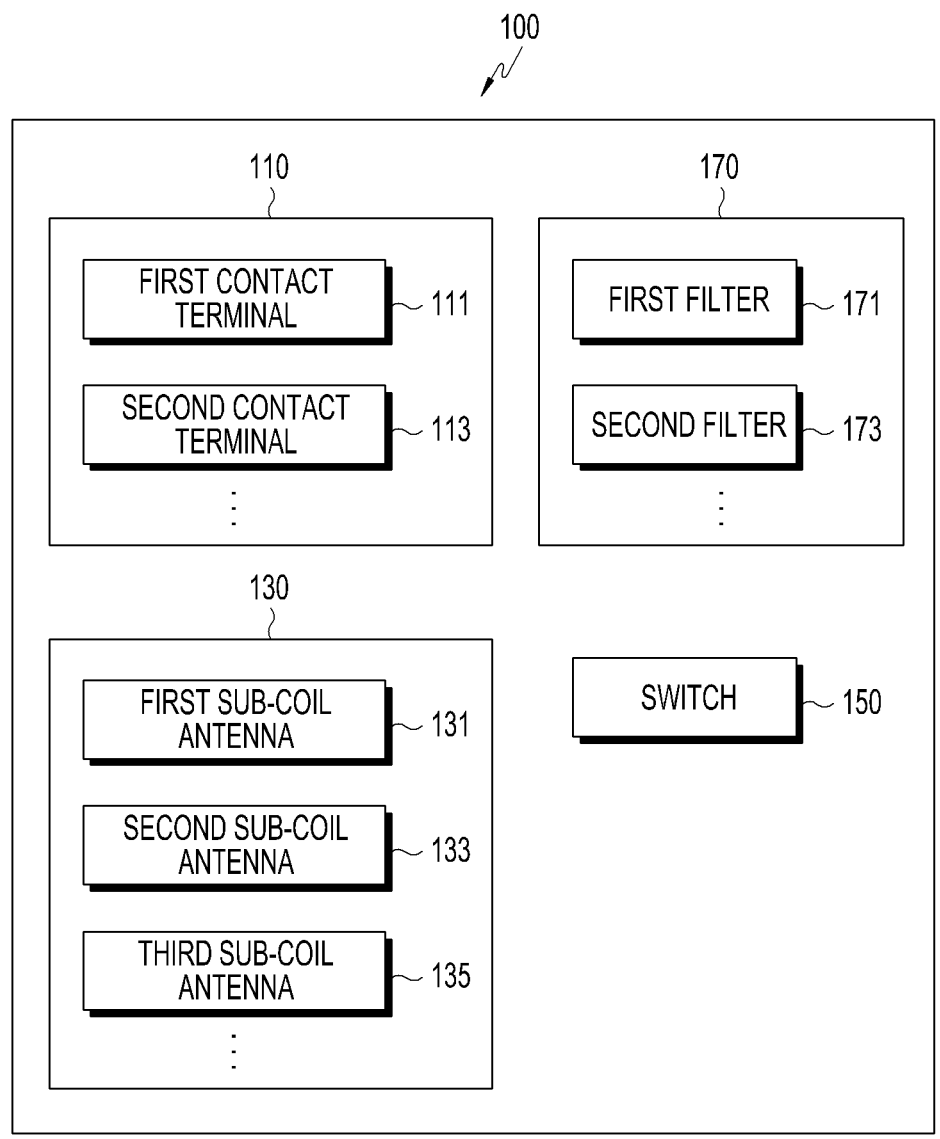
FIG. 1 is a block diagram of an antenna device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, the terms "include" or "may include refer to the presence of disclosed functions, operations or elements, and do not restrict the addition of one or more functions, operations or elements. Further, the terms "include," "have," and their conjugates are intended merely to denote a certain feature, numeral, operation, element, component, or a combination thereof, and should not be construed to initially exclude the existence of or a possibility of addition of one or more other features, numerals, operations, elements, components, or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The numeric modifiers such as "first," "second," or the like may modify various component elements in the various embodiments but may not limit corresponding component elements. For example, the above expressions do not limit the sequence, quantity, and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present disclosure.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to various embodiments of the present disclosure may be a device including a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, a wearable device (e.g., a head-mounted device (HMD) such as electronic glasses, electronic clothes, an electronic bracelet, an electronic necklace, an electronic appcessory, an electronic tattoo, or a smart watch).

According to various embodiments of the present disclosure, the electronic device may be a smart home appliance with a communication function. The smart home appliances may include at least one of, for example, televisions (TVs), digital versatile disc (DVD) players, audio players, refrigerators, air conditioners, cleaners, ovens, microwaves, washing machines, air purifiers, set-top boxes, TV boxes (e.g., HomeSync' of Samsung, Apple TV™, or Google TV™), game consoles, electronic dictionaries, electronic keys, camcorders, or electronic frames.

According to various embodiments of the present disclosure, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to various embodiments of the present disclosure, the electronic device may include at least one of a part of furniture or a building/structure having a communication function, an electronic board, an electronic signature receiving device, a projector, and various measuring instruments (e.g., a water meter, an electric meter, a gas meter, a radio wave meter, and the like). The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

In various embodiments of the present disclosure, the term "user" may indicate a person using an electronic device or a device (e.g. an artificial intelligence electronic device) using an electronic device.

FIG. 1 is a block diagram of an antenna device according to an embodiment of the present disclosure.

Referring to FIG. 1, the antenna device 100 may include contact terminals 110, sub-coil antennas 130, a switch 150, and filters 170.

The contact terminals 110 may include two or more contact terminals, for example, a first contact terminal 111 and a second contact terminal 113.

The contact terminals 110 may selectively contact the contact terminals (for example, a third contact terminal and a fourth contact terminal) of an electronic device, respectively.

The total number of the contact terminals 110 may correspond to the total number of specific functions (for example, a near field communication (NFC) communication and/or wireless charging) of the electronic device that employs sub-coil antennas 130, that is, the total number of antennas that are necessary to execute the specific functions. For example, when the number of the specific functions of the electronic device that employs the contact terminals 110 is four, the total number of the contact terminals 110 may be two, and when the number of the specific functions of the electronic device that employs sub-coil antennas 130 is five, the total number of the contact terminals 110 may be three. For example, a maximum of four control signals for controlling the switch 150 may be transmitted through two contact terminals, and accordingly, four coil antennas may be formed. Furthermore, for example, eight control signals for controlling the switch 150 may be transmitted through three contact terminals, and accordingly, eight coil antennas may be formed.

Meanwhile, the third contact terminal and the fourth contact terminal of the electronic device may be connected to an application processor (AP) of the electronic device. The third contact terminal and the fourth contact terminal may be connected to a signal transmission terminal from which a communication (e.g., a signal for communication in a magnetic induction scheme) is received and a signal reception terminal by which a signal for communication in a magnetic induction scheme is received, respectively, according to an operation of a module for performing specific functions of the electronic device that employs at least one of the sub-coil antennas 130 of the electronic device. The signal transmission terminal and the signal reception terminal may include configurations such as switches that connect the signal transmission terminal and the signal reception terminal to any one module, under the control of an AP.

The sub-coil antennas 130 may include, for example, a first sub-coil antenna 131, a second sub-coil antenna 133, and/or a third sub-coil antenna 135.

The total number of the sub-coil antennas 130 may correspond to the total number of the specific functions that employ the sub-coil antennas 130 (for example, NFC communication and/or wireless charging). For example, when the number of the specific functions of the electronic device that employs the sub-coil antennas 130 is two, the number of the sub-coil antennas 130 may be two, and when the number of the specific functions of the electronic device that employs the sub-coil antennas 130 is three, the number of the sub-coil antennas 130 may be three.

The number of the sub-coil antennas 130 may correspond to the number of the contact terminals 110, and the maximum number of the sub-coil antennas 130 may correspond to the contact terminals. For example, when the number of the contact terminals 110 is two, the sub-coil antennas 130 may include four sub-coil antennas.

The sub-coil antennas 130 may be arranged to be spaced apart from each other in a radial direction. For example, the second sub-coil antenna 133 of the sub-coil antennas 130 including the first sub-coil antenna 131 and the second sub-coil antenna 133 may be arranged inside the first sub-coil antenna 131. Furthermore, for example, among the sub-coil antennas 130 including a first sub-coil antenna 131, a second sub-coil antenna 133, and a third sub-coil antenna 135, the second sub-coil antenna 133 may be arranged inside the first sub-coil antenna 131 and the third sub-coil antenna 135 may be arranged inside the second sub-coil antenna 133.

Each of the sub-coil antennas 130 may have at least one loop. Furthermore, the lengths, intervals, number (the number of turns) of the loops for the sub-coil antennas 130, and the intervals between the loops may be determined in consideration of the frequencies of the specific functions of the electronic device that employs the sub-coil antennas 130.

The switch 150 is connected to the first contact terminal 111 and the second contact terminal 113, and at least one of the sub-coil antennas 130 may be connected to the first contact terminal and the second contact terminal according to control signals that are input through the first contact terminal and the second contact terminal.

For example, the switch 150 may be configured such that the sub-coil antennas 130 are connected in series to each other according to the control signals input through the first contact terminal 111 and the second contact terminal 113. Accordingly, two ends of the sub-coil antennas 130 connected in series may be connected to the first contact terminal 111 and the second contact terminal 113, respectively. For example, when the sub-coil antennas 130 are arranged to be spaced apart from each other in a radial direction, the switch 150 connects the sub-coil antennas 130 in series according to a control signal, so that two ends of any one sub-coil antenna may be connected to the first contact terminal 111 and the second contact terminal 113, respectively.

For example, the switch 150 may be configured such that the first sub-coil antenna 131 and the second sub-coil antenna 133 are connected in series to each other according to the control signals input through the first contact terminal 111 and the second contact terminal 113. Accordingly, two ends of the first sub-coil antenna 131 and the second sub-coil antenna 133 connected in series to each other may be connected to the first contact terminal 111 and the second contact terminal 113, respectively. For example, when the sub-coil antennas 130 are arranged to be spaced apart from each other in a radial direction such that the second sub-coil antenna 133 is arranged inside the first sub-coil antenna 131, the first sub-coil antenna 131 and the second sub-coil antenna 133 are connected in series by the switch 150 according to a control signal input from the electronic device, so that the two ends of the first sub-coil antenna 131 or the two ends of the second sub-coil antenna 133 may be connected to the first contact terminal 111 and the second contact terminal 113.

For example, the switch 150 may be configured such that the first sub-coil antenna 131, the second sub-coil antenna 133, and the third sub-coil antenna 135 of the sub-coil antennas 130 are connected in series to each other according to the control signals input through the first contact terminal 111 and the second contact terminal 113. Accordingly, two ends of the first sub-coil antenna 131, the second sub-coil antenna 133, and the third sub-coil antenna 135 connected in series to each other may be connected to the first contact terminal 111 and the second contact terminal 113, respectively. For example, when the sub-coil antennas 130 are arranged to be spaced apart from each other in a radial direction such that the second sub-coil antenna 133 is arranged inside the first sub-coil antenna 131 and the third sub-coil antenna 135 is arranged inside the second sub-coil antenna 133, the first sub-coil antenna 131, the second sub-coil antenna 133, and the third sub-coil antenna 135 are connected in series to each other by the switch 150, so that the two ends of the first sub-coil antenna 131, the two ends of the second sub-coil antenna 133, or the two ends of the third sub-coil antenna 135 may be connected to the first contact terminal 111 and the second contact terminal 113, respectively.

The filters 170 may include a first filter 171 and a second filter 173. The first filter 171 and the second filter 173 may be connected to the first contact terminal 111 and the second contact terminal 113 to pass a direct current (DC) signal. The first filter 171 is connected to the first contact terminal 111, the second filter 173 is connected to the second contact terminal 113, and the first filter 171 and the second filter 173 are connected to the switch 150, so that a control signal (e.g., the DC signal) may be input to the switch. The first filter 171 and the second filter 173 may be resistor inductor capacitor (RLC) filters or inductor capacitor (LC) filters.

According to an embodiment of the present disclosure, any one of the sub-coil antennas may be connected in series to the first contact terminal 111 and the second contact terminal 113 by not connecting the plurality of sub-coil antennas 130 or the sub-coil antennas connected in series to each other may be connected in series to the first contact terminal 111 and the second contact terminal 113 by connecting two or more sub-coil antennas of the plurality of sub-coil antennas 130, according to control signals input through the first filter 171 and the second filter 173.

For example, the first contact terminal 111 is connected to a first end of the first sub-coil antenna 131, and the switch may include a first control terminal and a second control terminal connected to the first filter 171 and the second filter 173. An input terminal for a magnetic induction scheme is input through the second contact terminal 113. A first output terminal connected to a second end of the first sub-coil antenna 131, and output terminals are connected to two ends of sub-coil antennas other than the first sub-coil antennas, respectively. For example, the output terminals may include a second output terminal and a third output terminal connected to the two ends of the second sub-coil antenna 133, respectively, and a fourth output terminal and a fifth output terminal connected to the two ends of the third sub-coil antenna 135, respectively.

Figure 2A:
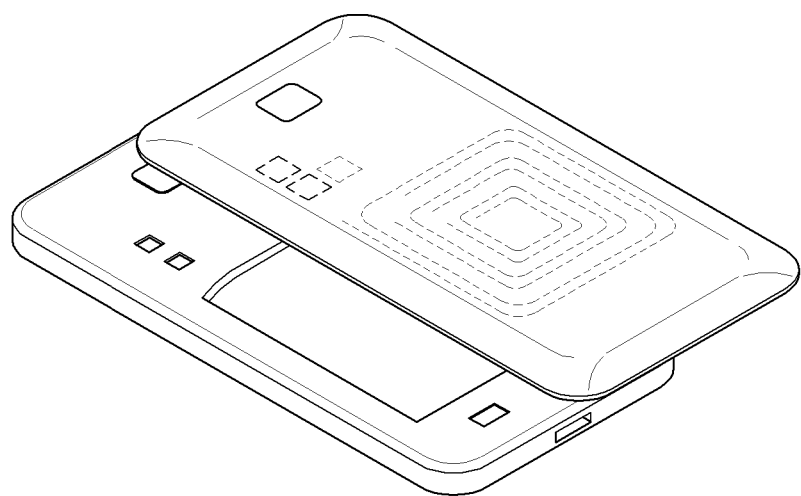
FIGS. 2A and 2B are views illustrating accessories of an electronic device having an antenna device according to various embodiments of the present disclosure.
Figure 2B:
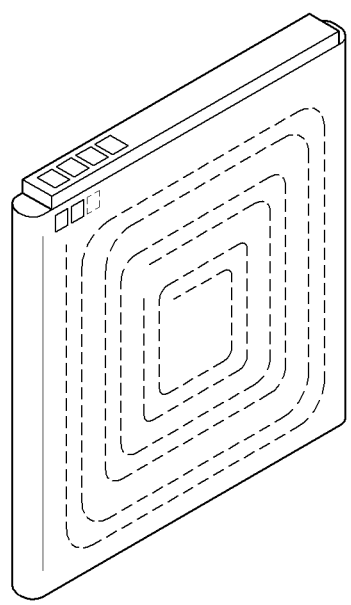

FIGS. 2A and 2B are views illustrating accessories of an electronic device having an antenna device according to various embodiments of the present disclosure.

Referring to FIGS. 2A and 2B, the antenna device may be formed in a battery cover or a battery. For example, sub-coil antennas may be formed in a battery cover as illustrated in FIG. 2A, and contact terminals may be formed on the outside of the battery cover to contact with contact terminals of an electronic device. The switch may be formed in the battery cover. The contact terminals formed in the battery cover may have the form of pads, and the contact terminals of the electronic device may have the form of pins. Alternatively, the contact terminals formed in the battery cover may have the form of pins, and the contact terminals of the electronic device may have the form of pads.

Further, sub-coil antennas may be formed in a battery as illustrated in FIG. 2B, and contact terminals may be formed on the outside of the battery to contact with contact terminals of an electronic device. Furthermore, the switch may be formed in the battery. The contact terminals formed in the battery may have the form of pads, and the contact terminals of the electronic device may have the form of pins. Alternatively, the contact terminals formed in the battery may have the form of pads, and the contact terminals of the electronic device may have the form of pins.

Meanwhile, the battery cover may be attached to and detached from a rear surface of the electronic device, and may cover at least a portion of the rear surface of the electronic device and the battery. Further, the battery cover may cover a portion of the rear surface of the electronic device, the battery, at least a portion of one side surface of the electronic device, or at least a portion of a front surface of the electronic device.

The battery is provided on the rear surface of the electronic device and supplies electric power to the electronic device, and may be attached to and detached from the rear surface of the electronic device by the user. The battery may be embedded in the electronic device so as not to be attached or detached by the user.

FIGS. 3A to 3D are views illustrating antenna devices according to various embodiments of the present disclosure.

Referring to FIGS. 3A to 3D, using a switch 350 (for example, the switch 150), for example, an antenna device 300 (for example, the electronic device 100) that supports a first scheme that requires a two-turn coil antenna, a second scheme that requires a four-turn coil antenna, and a third scheme that requires a six-turn coil antenna may be implemented with three two-turn sub-coil antennas 330 (for example, the sub-coil antennas 130) and two contact terminals 310 (for example, the contact terminals 110). Accordingly, a large mounting area is required according to the related art because a two-turn sub-coil antenna, a four-turn sub-coil antenna, a six-turn sub-coil antenna, and a total of six contact terminals are required to implement the antenna device for supporting all the three schemes, but the present disclosure can solve this problem. For example, as compared with the related art, the present disclosure can minimize the number of contact terminals, and reduce manufacturing costs of the sub-coil antennas.

The antenna device 300 may include contact terminals 310, sub-coil antennas 330, a switch 350, and filters 370 (for example, the filters 170).

The contact terminals 310 may include a first contact terminal 311 (for example, the first contact terminal 111) and a second contact terminal 313 (for example, the second contact terminal 113).

The sub-coil antennas 330 may include a first sub-coil antenna 331 (for example, the first sub-coil antenna 131), a second sub-coil antenna 333 (for example, the second sub-coil antenna 133), and a third sub-coil antenna 335 (for example, the third sub-coil antenna 135). The first sub-coil antenna 331, the second sub-coil antenna 333, and the third sub-coil antenna 335 may be implemented by two-turn coils.

The switch 350 may include a first control terminal 351, a second control terminal 352, an input terminal 353, a first output terminal 354, a second output terminal 355, a third output terminal 356, a fourth output terminal 357, and a fifth output terminal 358.

The filters 370 may include a first filter 371 (for example, the first filter 171) and a second filter (for example, the second filter 173) that are connected to the first contact terminal 311 and the second contact terminal 313, respectively, to pass a DC signal. The first filter 371 and the second filter 373 may be implemented by LC filters.

The first contact terminal 311 and the second contact terminal 313 may be connected to the electronic device 30 to receive a control signal for controlling switching of the switch 350 from an AP 31. The control signal may be a control signal corresponding to any one module selected from modules 32, for example, an NFC module 33 and a wireless charging module 34. The first contact terminal 311 and the second contact terminal 313 may receive the control signal through the first filter 38 and the second filter 39.

The first contact terminal 311 and the second contact terminal 313 may be connected to modules 32 such that a signal for communication in a magnetic induction scheme may be input from any one module selected from the modules 32 through the second contact terminal 313. The signal for communication in a magnetic induction scheme may be input to the any one module through the first contact terminal 311 via at least one sub-coil antenna connected to the first contact terminal 311 and the second contact terminal 313 according to a switching operation of the switch 350. The electronic device may include a switch, and may connect to any one module of the modules 32.

The first contact terminal 311 may be connected to a first control terminal 351 of the switch 350 and a first end 3311 of the first sub-coil antenna 331 and the second contact terminal 313 may be connected to a second control terminal 352 of the switch 350 and an input terminal 353 of the switch 350. The first filter 371 may be formed between the first contact terminal 311 and the first control terminal 351, and the second filter 371 may be formed between the second contact terminal 313 and the second control terminal 352.

A first output terminal 354 of the switch 350 may be connected to a second end 3313 of the first sub-coil antenna 354.

A second output terminal 355 and a third output terminal 356 of the switch 350 may be connected to a first end 3331 and a second end 3333 of the second sub-coil antenna 333, respectively.

A fourth output terminal 357 and a fifth output terminal 358 of the switch 350 may be connected to a first end 3351 and a second end 3353 of the third sub-coil antenna 335, respectively.

Figure 3A:
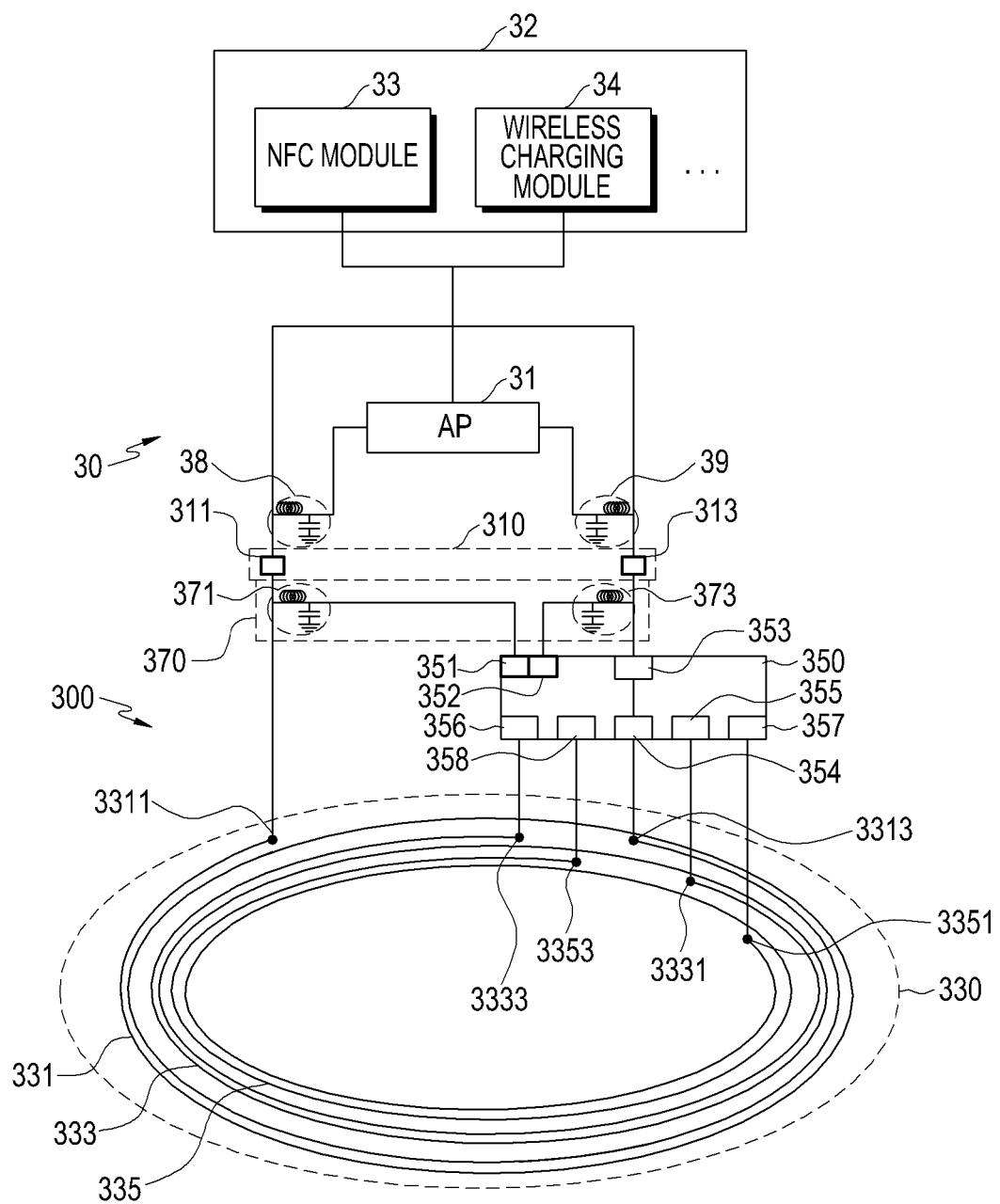
FIGS. 3A to 3D are views illustrating antenna devices according to various embodiments of the present disclosure.

Meanwhile, control signals (a control signal of a first control terminal 351 and a control signal of a second control terminal 352) that are input to a first control terminal 351 and a second control terminal 352 of the switch 350 may be (0, 0), (0, 1), (1, 0), or (1, 1), and control signals corresponding to the modules 32 formed in the electronic device 30 may be designated in advance. For example, a control signal corresponding to a first module (for example, the NFC module 33) of the modules 32 formed in the electronic device 30 may be (0, 0), and the first module may require a coil antenna of six turns in which all of the sub-coil antennas 330 illustrated in FIG. 3A are connected in series to each other. For example, a control signal corresponding to a second module (for example, the wireless charging module 34) of the modules 32 may be (0, 1), and the second module may require a coil antenna of four turns in which some of the sub-coil antennas 330 illustrated in FIG. 3A are connected in series to each other. For example, a control signal corresponding to a third module of the modules 32 may be (1, 0), and the third module may require a coil antenna of two turns along the sub-coil antennas 330 illustrated in FIG. 3A.

Figure 3B:
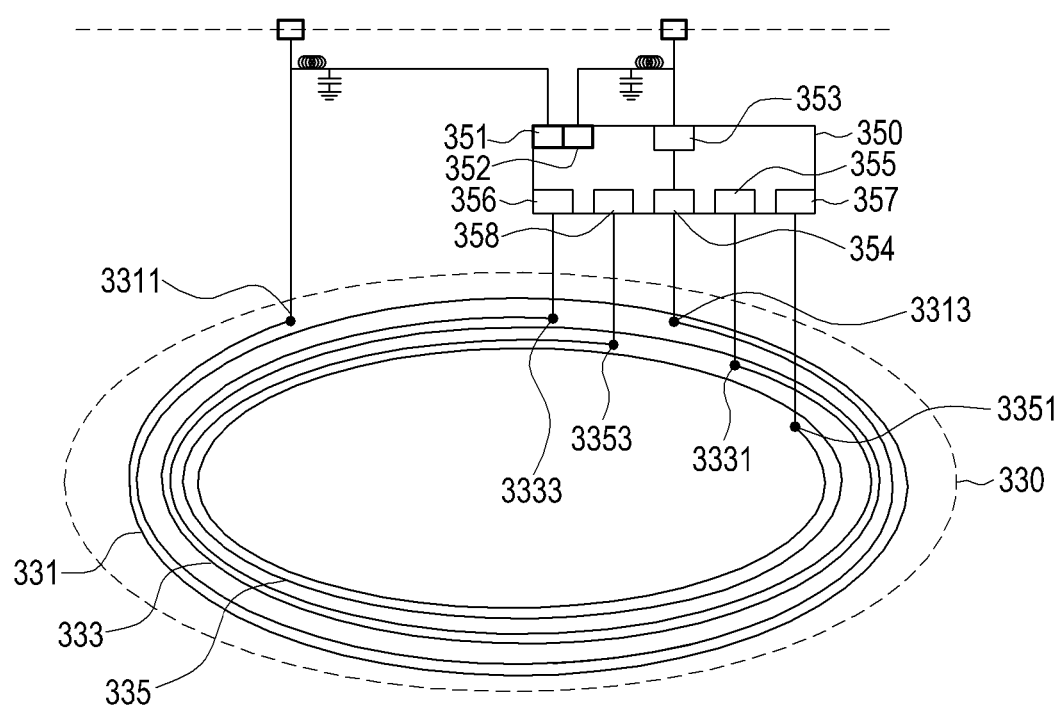

Referring to FIG. 3B, when a control signal input through the first contact terminal 311 and the second contact terminal 313 is a first control signal, the switch 350 may connect the input terminal 353 and the first output terminal 354. For example, the first end 3311 of the first sub-coil antenna 331 may be connected to the first contact terminal 311, and the second end 3313 of the first sub-coil antenna 331 may be connected to the second contact terminal 313. According to the operation of the switch 350, the first sub-coil antenna 331 is connected in series to the first contact terminal 311 and the second contact terminal 313 so that the antenna device 300 may be operated as a coil antenna having two turns (for example, in a first scheme).

Figure 3C:
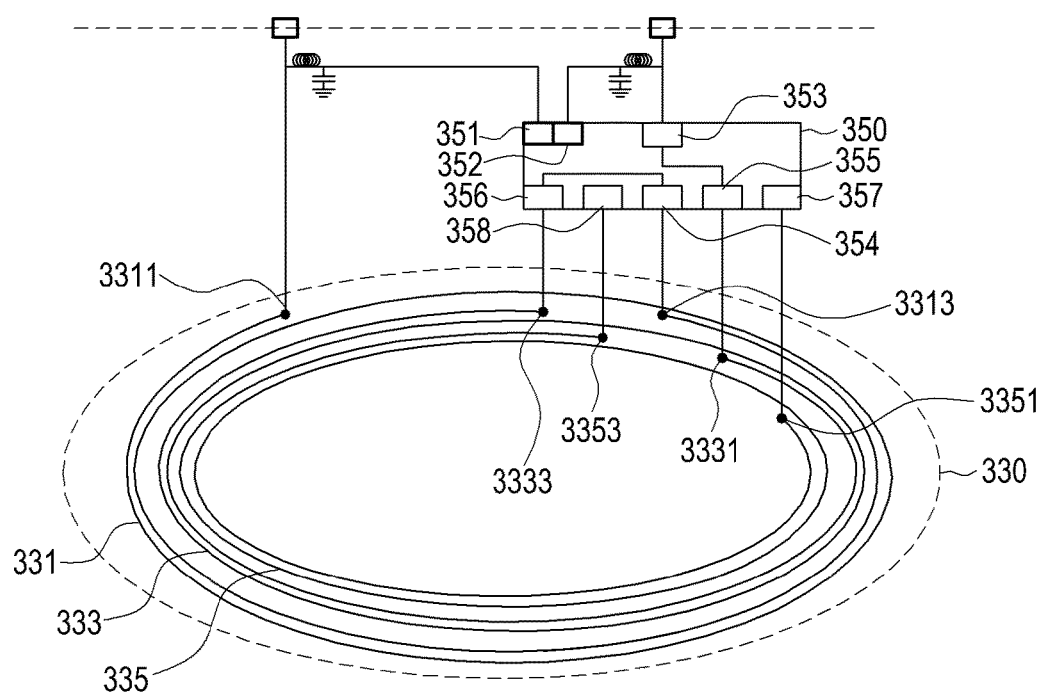

Referring to FIG. 3C, when a control signal input through the first contact terminal 311 and the second contact terminal 313 is a second control signal, the switch 350 may connect the input terminal 353 and the first output terminal 354 and connect the first output terminal 354 and the third output terminal 356. For example, the first end 3331 of the second sub-coil antenna 333 may be connected to the second contact terminal 313, the second end 3333 of the second sub-coil antenna 333 may be connected to the second end 3313 of the first sub-coil antenna 331, and the first end 3311 of the first sub-coil antenna 331 may be connected to the first contact terminal 311. According to the operation of the switch 350, the first sub-coil antenna 331 and the second sub-coil antenna 333 connected in series to each other are connected in series to the first contact terminal 311 and the second contact terminal 313 so that the antenna device 300 may be operated as a coil antenna having four turns (for example, in a second scheme).

Figure 3D:
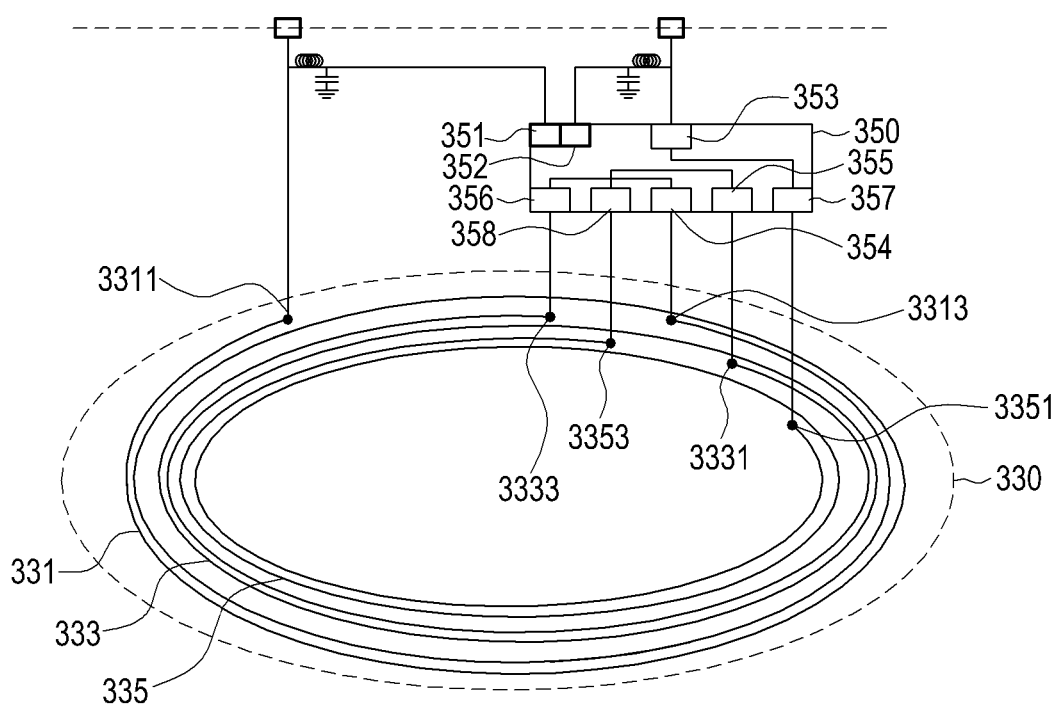

Referring to FIG. 3D, when a control signal input through the first contact terminal 311 and the second contact terminal 313 is a third control signal, the switch 350 may connect the input terminal 353 and the fourth output terminal 357, connect the second output terminal 355 and the fifth output terminal 358, and connect the first output terminal 354 and the third output terminal 356. For example, the first end 3351 of the third sub-coil antenna 333 may be connected to the second contact terminal 313, the second end 3353 of the third sub-coil antenna 335 may be connected to the first end 3331 of the second sub-coil antenna 333, the second end 3333 of the second sub-coil antenna 333 may be connected to the second end 3313 of the first sub-coil antenna 331, and the first end 3311 of the first sub-coil antenna 331 may be connected to the first contact terminal 311. According to the operation of the switch 350, the first sub-coil antenna 331 and the second sub-coil antenna 333 connected in series to each other are connected in series to the first contact terminal 311 and the second contact terminal 313 so that the antenna device 300 may be operated as a coil antenna having six turns (for example, in a third scheme).

Figure 4:
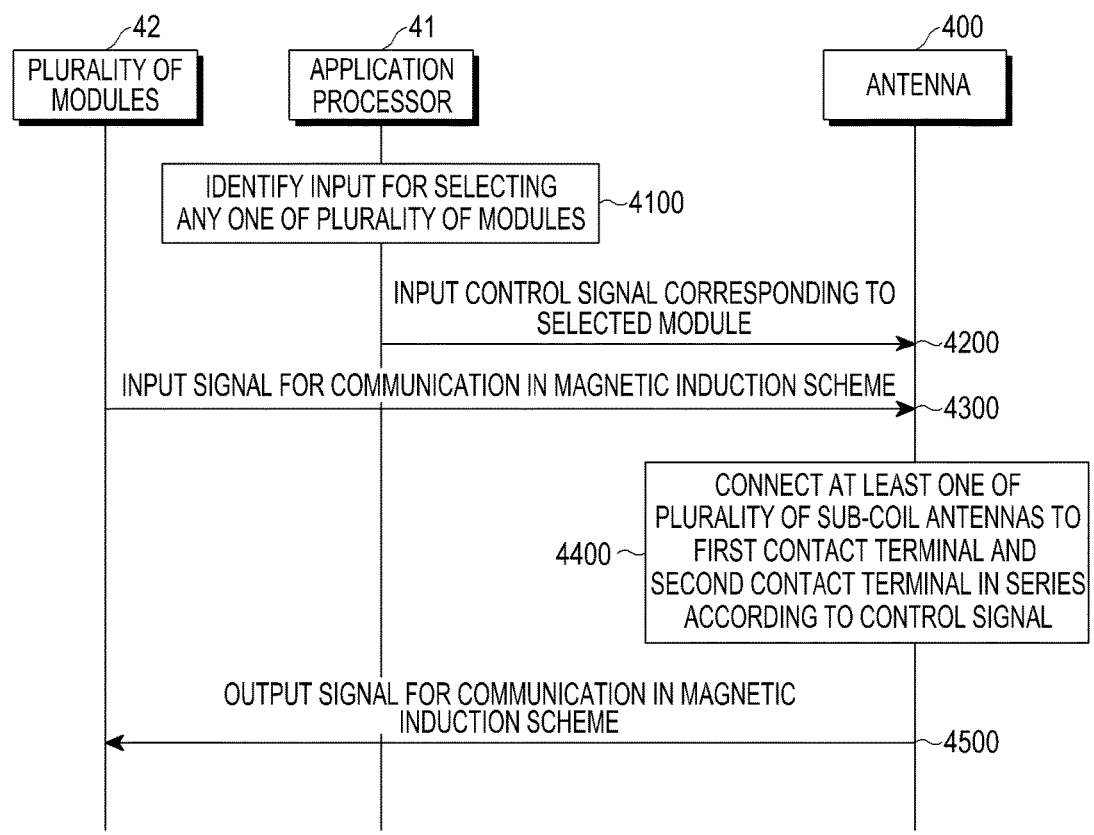
FIG. 4 is a flow diagram of an antenna controlling operation of an electronic device according to an embodiment of the present disclosure.

FIG. 4 is a flow diagram of an antenna controlling operation of an electronic device according to an embodiment of the present disclosure.

Referring to FIG. 4, the electronic device may receive an input for selecting any one of the modules formed in the interior of the electronic device. Further, the antenna may include: contact terminals including a first contact terminal and a second contact terminal; sub-coil antennas; and a switch that is connected to the first contact terminal and the second contact terminal to connect at least one of the sub-coil antennas to the first contact terminal and the second contact terminal according to a control signal input through the first contact terminal and the second contact terminal, each of the sub-coil antennas having at least one loop, wherein at least one of the sub-coil antennas are connected to the first contact terminal and the second contact terminal according to the input. A module may be connected to the antenna through the first contact terminal and the second contact terminal.

In operation 4100, the AP 41 of the electronic device may identify an input for selecting any one of the modules 42 formed in the interior of the electronic device. The input may be an input for executing any one module of the modules 42, for example, according to a manipulation of the user. The input may be, for example, reception of a signal for communication in a magnetic induction scheme corresponding to any one module that may automatically execute any one module of the modules.

In operation 4200, the AP 41 may input a control signal (for example, a DC signal) corresponding to the selected module to an antenna 400.

In operation 4300, any one module of which an input is identified according to operation 4100, among the modules 42, may input a signal for communication in a magnetic induction scheme to the antenna 400.

In operation 4400, according to the control signal, at least one of the sub-coil antennas of the antenna 400 may be connected in series to the first contact terminal and the second contact terminal, and accordingly, the input signal for communication in a magnetic induction scheme may be output to any one module of the modules 42 through the at least one sub-coil antenna.

Figure 5:
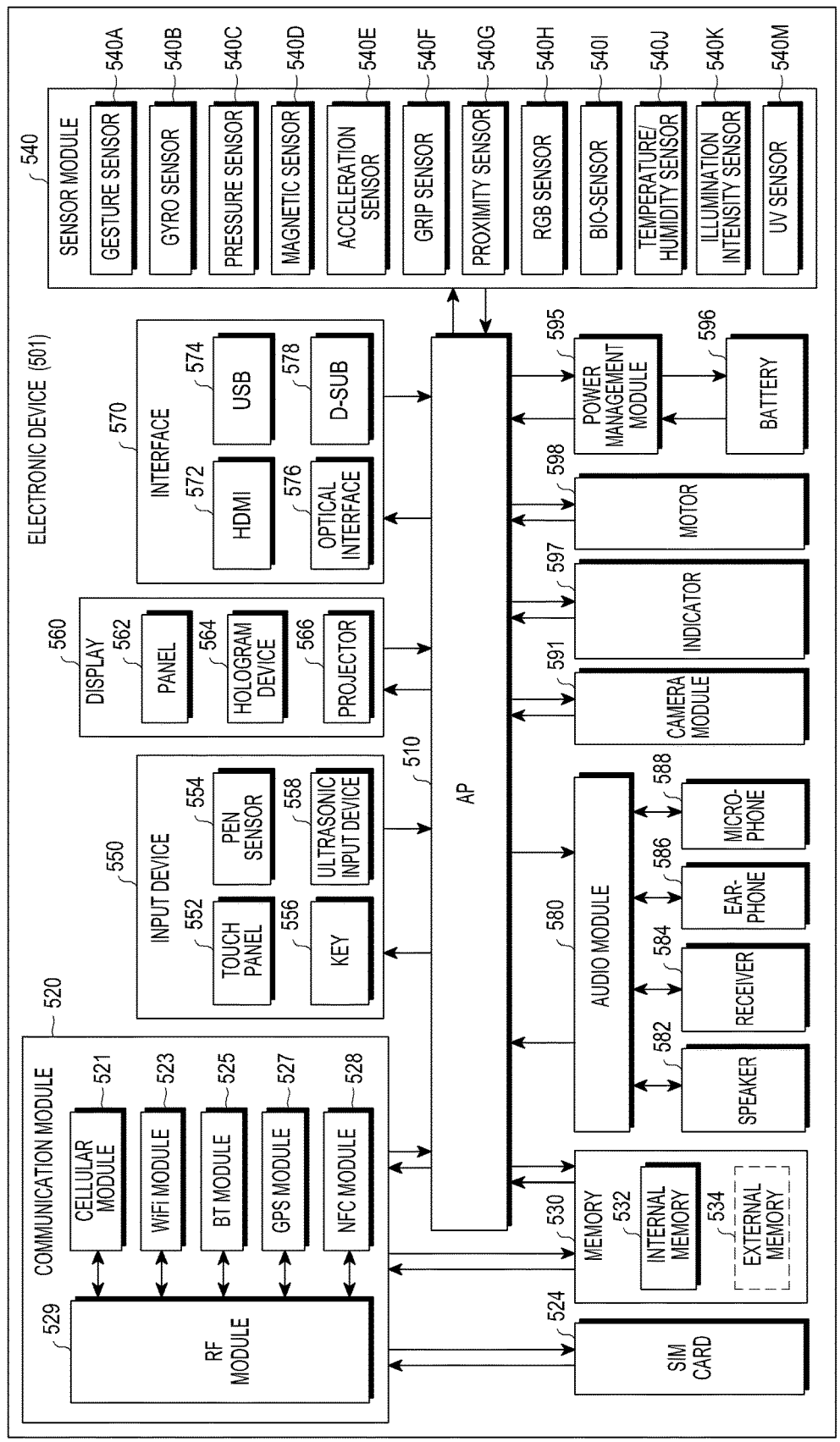
FIG. 5 is a block diagram of an electronic device according to various embodiments of the present disclosure.
Figure 6A:
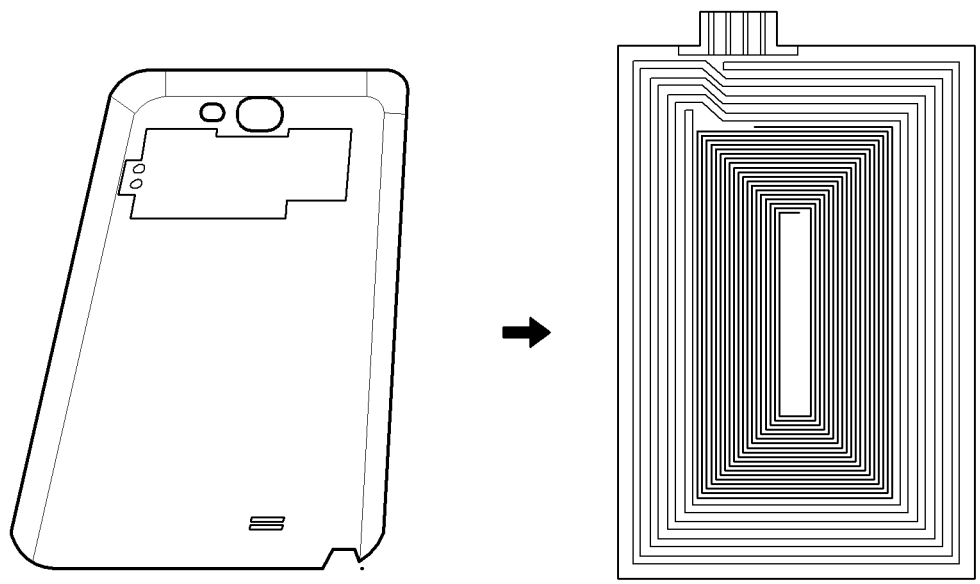
FIGS. 6A and 6B are views illustrating a coil antenna according to the related art.
Figure 6B:
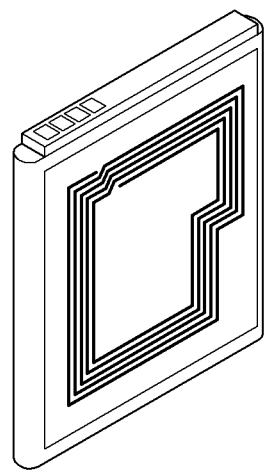

FIG. 5 is a block diagram of an electronic device according to various embodiments of the present disclosure.

Referring to FIG. 5, an electronic device 501 may include, for example, all or some of the electronic device 30 illustrated in FIG. 3. The electronic device 501 may include at least one AP 510 (for example, the AP 31), a communication module 520, a subscriber identification module (SIM) card 524, a memory 530, a sensor module 540, an input device 550, a display 560, an interface 570, an audio module 580, a camera module 591, a power management module 595, a battery 596, an indicator 597, or a motor 598.

The AP 510 may control a hardware or software components connected thereto by driving an operating system or an application program and perform a variety of data processing and calculations. The AP 510 may be implemented as, for example, a system on chip (SoC). According to an embodiment of the present disclosure, the AP 510 may further include a graphics processing unit (GPU) and/or an image signal processor. The AP 510 may include at least some of the components (for example, a cellular module 521) illustrated in FIG. 5. The AP 510 may load instructions or data, received from at least one other component (for example, a non-volatile memory), in a volatile memory to process the loaded instructions or data, and may store various types of data in a non-volatile memory.

The communication module 520 may include, for example, a cellular module 521, a Wi-Fi module 523, a Bluetooth (BT) module 525, a GPS module 527, an NFC module 528 (for example, the NFC module 33), and a radio frequency (RF) module 529.

The cellular module 521 may provide a voice call, video call, text message services, or Internet services through, for example, a communication network. According to an embodiment of the present disclosure, the cellular module 521 may distinguish between and authenticate electronic devices 501 within a communication network using a SIM (for example, the SIM card 524). According to an embodiment of the present disclosure, the cellular module 521 may perform at least some of the functions which may be provided by the AP 510. According to an embodiment of the present disclosure, the cellular module 521 may include a communication processor (CP).

The Wi-Fi module 523, the BT module 525, the GPS module 527, and the NFC module 528 may include, for example, a processor for processing data transmitted/received through the corresponding module. According to any embodiment of the present disclosure, at least some (two or more) of the cellular module 521, the Wi-Fi module 523, the BT module 525, the GPS module 527, and the NFC module 528 may be included in one integrated chip (IC) or IC package.

The RF module 529 may transmit/receive, for example, a communication signal (for example, an RF signal). The RF module 529 may include, for example, a transceiver, a power amplifier module (PAM), a frequency filter, a low noise amplifier (LNA) or an antenna. According to an embodiment of the present disclosure, at least one of the cellular module 521, the Wi-Fi module 523, the BT module 525, the GPS module 527, and the NFC module 528 may transmit/receive an RF signal through a separate RF module.

The SIM card 524 may include, for example, a card including a SIM and/or an embedded SIM, and may further include unique identification information (for example, an integrated circuit card identifier (ICCID)) or subscriber information (for example, international mobile subscriber identity (IMSI)).

The memory 530 may include, for example, an internal memory 532 or an external memory 534. The internal memory 532 may include at least one of, for example, a volatile memory (for example, a dynamic random access memory (DRAM), a static RAM (SRAM), a synchronous DRAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a flash memory (for example, a NAND flash memory or a NOR flash memory), a hard driver, or a solid state drive (SSD).

The external memory 534 may further include a flash drive, for example, a compact flash (CF), a secure digital (SD), a micro-SD, a mini-SD, an extreme digital (xD), a memory stick, or the like. The external memory 534 may be functionally and/or physically connected to the electronic device 501 through various interfaces.

The sensor module 540 may measure, for example, a physical quantity or detect an operation state of the electronic device 501, and may convert the measured or detected information to an electrical signal. The sensor module 540 may include at least one of, for example, a gesture sensor 540A, a gyro sensor 540B, an atmospheric pressure sensor 540C, a magnetic sensor 540D, an acceleration sensor 540E, a grip sensor 540F, a proximity sensor 540G, a color sensor 540H (for example, a red/green/blue (RGB) sensor), a biometric sensor 540I, a temperature/humidity sensor 540J, an illumination sensor 540K, and an ultraviolet (UV) sensor 540M. Additionally or alternatively, the sensor module 540 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 540 may further include a control circuit for controlling at least one sensor included therein. In any embodiment of the present disclosure, the electronic device 501 may further include a processor configured to control the sensor module 540 as a part of or separately from the AP 510, and may control the sensor module 540 while the AP 510 is in a sleep state.

The input device 550 may include, for example, a touch panel 552, a (digital) pen sensor 554, a key 556, or an ultrasonic input device 558. The touch panel 552 may use at least one of, for example, a capacitive type, a resistive type, an infrared type, and an ultrasonic type. The touch panel 552 may further include a control circuit. The touch panel 552 may further include a tactile layer, and provide a tactile reaction to a user.

The (digital) pen sensor 554 may include, for example, a recognition sheet which is a part of the touch panel or a separate recognition sheet. The key 556 may include, for example, a physical button, an optical key or a keypad. The ultrasonic input unit 558 may input data through an input means that generates an ultrasonic signal, and the electronic device 501 may identify data by detecting a sound wave with a microphone (for example, a microphone 588).

The display 560 may include a panel 562, a hologram device 564, or a projector 566. The panel 562 may be embodied to be, for example, flexible, transparent, or wearable. The panel 562 may also be configured to be integrated with the touch panel 552 as a single module. The hologram device 564 may show a stereoscopic image in the air by using interference of light. The projector 566 may project light onto a screen to display an image. For example, the screen may be located inside or outside the electronic device 501. According to an embodiment of the present disclosure, the display 560 may further include a control circuit for controlling the panel 562, the hologram device 564, or the projector 566.

The interface 570 may include, for example, a high-definition multimedia interface (HDMI) 572, a universal serial bus (USB) 574, an optical interface 576, or a D-subminiature (D-sub) 578. Additionally or alternatively, the interface 570 may include, for example, a mobile HD link (MHL) interface, an SD card/multi-media card (MMC) interface, or an infrared data association (IrDA) standard interface.

The audio module 580 may bilaterally convert, for example, a sound and an electrical signal. The audio module 580 may process sound information input or output through, for example, a speaker 582, a receiver 584, earphones 586, the microphone 588, or the like.

The camera module 591 is a device which may photograph a still image and a dynamic image. According to an embodiment of the present disclosure, the camera module 591 may include one or more image sensors (for example, a front sensor or a back sensor), a lens, an image signal processor (ISP) or a flash (for example, light-emitting diode (LED) or xenon lamp).

The power management module 595 may manage, for example, power of the electronic device 501. According to an embodiment of the present disclosure, the power management module 595 may include a power management IC (PMIC), a charger IC, or a battery or fuel gauge. The PMIC may have a wired and/or wireless charging scheme. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The PMIC may include, for example, a wireless charging module. The battery gauge may measure, for example, the remaining amount of battery, a charging voltage and current, or temperature. The battery 596 may include, for example, a rechargeable battery and/or a solar battery.

The indicator 597 may indicate a particular status of the electronic device 501 or a part thereof (for example, the AP 510), for example, a booting status, a message status, a charging status, or the like. The motor 598 may convert an electrical signal into mechanical vibrations, and may generate a vibration or haptic effect. Although not illustrated, the electronic device 501 may include a processing device (for example, a GPU) for supporting mobile TV. The processing device for supporting mobile TV may process media data according to a standard of digital multimedia broadcasting (DMB), digital video broadcasting (DVB), media flow or the like.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific IC (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. The instruction, when executed by a processor (e.g., the AP 510), may cause the one or more processors to execute the function corresponding to the instruction. The computer-readable storage medium may be, for example, the memory 530.

The computer readable recording medium may include a hard disk, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An antenna device comprising:
   contact terminals comprising a first contact terminal and a second contact terminal;
   sub-coil antennas each including at least one loop; and
   a switch configured to selectively connect at least one of the sub-coil antennas to the first contact terminal and the second contact terminal according to control signals input through the first contact terminal and the second contact terminal,
   wherein the antenna device further comprises:
      a first filter connected to the first contact terminal, and
      a second filter connected to the second contact terminal to pass the control signals, and
   wherein the switch is further configured such that the at least one of the sub-coil antennas is connected in series to the first contact terminal and the second contact terminal according to control signals input through the first filter and the second filter.

2. The antenna device of claim 1, wherein the sub-coil antennas are arranged to be spaced apart from each other in a radial direction.

3. The antenna device of claim 2, wherein the switch is further configured to connect the sub-coil antennas in series according to the control signal.

4. The antenna device of claim 2, wherein the sub-coil antennas comprises:
   a first sub-coil antenna, and
   a second sub-coil antenna arranged inside the first sub-coil antenna,
   wherein the switch is configured to connect the first sub-coil antenna and the second sub-coil antenna in series according to the control signal.

5. The antenna device of claim 2, wherein the sub-coil antennas comprises:
   a first sub-coil antenna,
   a second sub-coil antenna arranged inside the first sub-coil antenna, and
   a third sub-coil antenna arranged inside the second sub-coil antenna, and
   wherein the switch is further configured to connect the first sub-coil antenna, the second sub-coil antenna, the third sub-coil antenna in series according to the control signal.

6. The antenna device of claim 1, wherein the sub-coil antennas are formed in the battery.

7. The antenna device of claim 1, wherein the sub-coil antennas are formed in the battery cover.

8. The antenna device of claim 1,
   wherein the first contact terminal is connected to a first end of a first sub-coil antenna of the sub-coil antennas, and
   wherein the switch further comprises:
      a first control terminal and a second control terminal connected to the first filter and the second filter,
      an input terminal to which a signal for communication in a magnetic induction scheme through the second contact terminal is input,
      a first output terminal connected to a second end of the first sub-coil antenna, and
      output terminals connected to two ends of sub-coil antenna other than the first sub-coil antenna, respectively.

9. The antenna device of claim 8,
   wherein each of the sub-coil antennas further comprises a second sub-coil antenna and a third sub-coil antenna, and
   wherein the output terminals comprise:
      a second output terminal and a third output terminal connected to two ends of the second sub-coil antenna, respectively, and
      a fourth output terminal and a fifth output terminal connected to two ends of the third sub-coil antenna, respectively.

10. The antenna device of claim 9, wherein when the control signal is a first control signal, the switch is further configured to connect the input terminal and the first output terminal.

11. The antenna device of claim 10, wherein when the control signal is a second control signal, the switch is further configured to connect the input terminal and the second output terminal and connects the first output terminal and the third output terminal.

12. The antenna device of claim 11, wherein when the control signal is a third control signal, the switch is further configured to:
   connect the input terminal and the fourth output terminal,
   connect the second output terminal and the fifth output terminal, and
   connect the first output terminal and the third output terminal.

13. A method of controlling an antenna device of an electronic device, the method comprising:
   receiving an input for selecting a module formed in the electronic device;
   reconfiguring a switch to selectively connect sub-coil antennas to form an antenna loop based on the selected module; and
   receiving a signal from the antenna loop,
   wherein the reconfiguring of the switch comprises controlling the switch such that at least one of the sub-coil antennas is connected in series to a first contact terminal of the antenna device and a second contact terminal of the antenna device according to control signals input through a first filter connected the first contact terminal and a second filter of the second contact terminal.

14. The method of claim 13, wherein the selected module is connected to the antenna device through the first contact terminal and the second contact terminal.

* * * * *